(12) United States Patent
Lau et al.

(10) Patent No.: US 6,857,603 B2
(45) Date of Patent: Feb. 22, 2005

(54) BAGGAGE COMPARTMENT INCLUDING A GUIDE CONNECTING A SUPPORT STRUCTURE AND A BIN

(75) Inventors: Michael Lau, Dollern (DE); Michael Mattern, Harsefeld (DE); Michael Schuld, Hamburg (DE)

(73) Assignee: Airbus Deutschland GmbH, Hamburg (DE)

(*) Notice: Subject to any disclaimer, the term of this patent is extended or adjusted under 35 U.S.C. 154(b) by 0 days.

(21) Appl. No.: 10/712,036

(22) Filed: Nov. 14, 2003

(65) Prior Publication Data

US 2004/0140398 A1 Jul. 22, 2004

Related U.S. Application Data

(63) Continuation of application No. 10/029,488, filed on Dec. 20, 2001.

(30) Foreign Application Priority Data

Dec. 20, 2000 (DE) .......................................... 100 63 932

(51) Int. Cl.[7] .............................................. B64C 1/00
(52) U.S. Cl. .................................... 244/118.1; 312/269
(58) Field of Search .......................... 244/118.1, 118.5, 244/117 R, 119, 137.1; 312/266, 269

(56) References Cited

U.S. PATENT DOCUMENTS

| 4,275,942 | A | | 6/1981 | Steidl |
|---|---|---|---|---|
| 4,368,937 | A | | 1/1983 | Palombo et al. |
| 5,244,269 | A | * | 9/1993 | Harriehausen et al. ...... 312/247 |
| 5,383,628 | A | | 1/1995 | Harriehausen et al. |
| 5,441,218 | A | | 8/1995 | Mueller et al. |
| 5,567,028 | A | | 10/1996 | Lutovsky et al. |
| 5,820,076 | A | | 10/1998 | Schumacher et al. |
| 5,839,694 | A | | 11/1998 | Bargull et al. |
| 5,934,615 | A | * | 8/1999 | Treichler et al. ......... 244/118.5 |
| 2002/0074913 | A1 | | 6/2002 | Lau et al. |

FOREIGN PATENT DOCUMENTS

| DE | 19546302 | 6/1997 |
|---|---|---|
| DE | 19800588 | 7/1999 |
| EP | 0049716 | 4/1982 |
| EP | 0594997 | 5/1994 |

* cited by examiner

Primary Examiner—Teri P. Luu
Assistant Examiner—Stephen A Holzen
(74) Attorney, Agent, or Firm—Oblon, Spivak, McClelland, Maier & Neustadt, P.C.

(57) ABSTRACT

A baggage compartment includes a support structure, a bin, and a guide. The bin defines an at least partially closed volume configured to store baggage. The guide connects the support structure and the bin. The guide is configured to move the bin along a first portion of a path linearly and a second portion of the path rotationally.

23 Claims, 4 Drawing Sheets

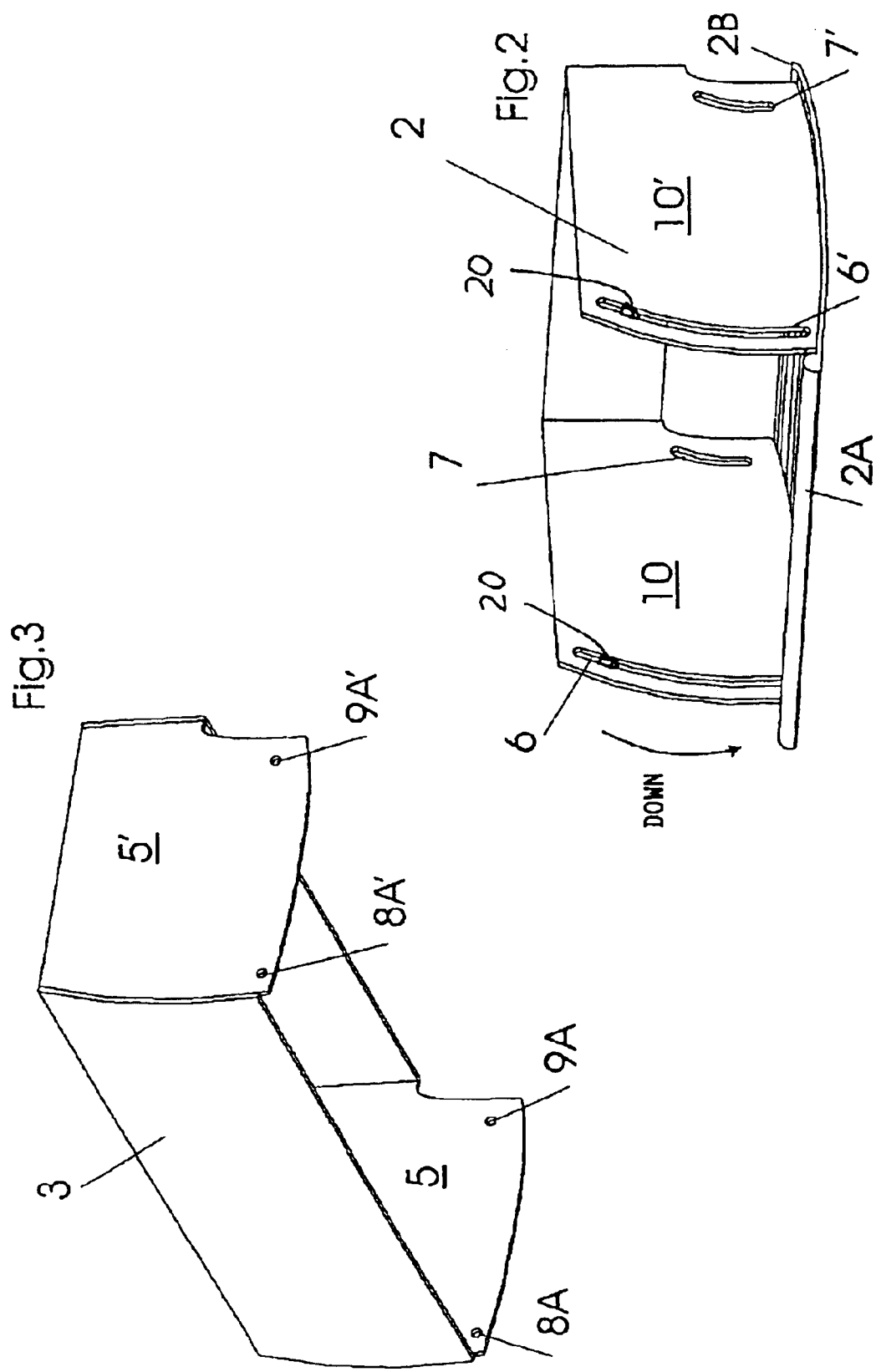

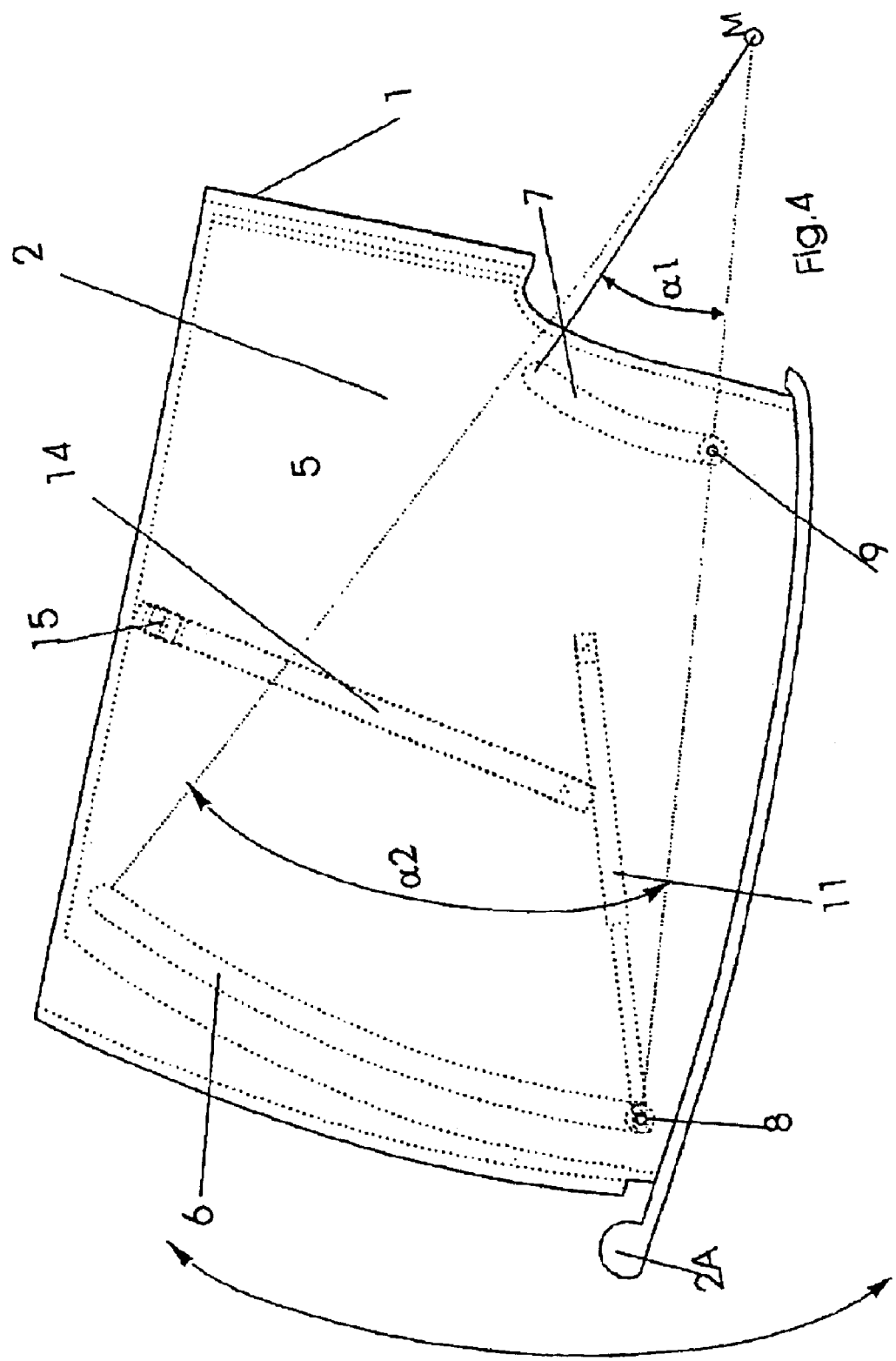

BAGGAGE COMPARTMENT INCLUDING A GUIDE CONNECTING A SUPPORT STRUCTURE AND A BIN

CROSS REFERENCE TO RELATED APPLICATIONS

This application claims priority under 35 U.S.C. § 119 to German Patent Application 100 63 932.1, filed on Dec. 20, 2000, and is a continuation of U.S. patent application Ser. No. 10/029,488, filed on Dec. 20, 2001, the disclosures of which are incorporated by reference herein in their entirety.

FIELD OF THE INVENTION

The invention relates to a baggage compartment with a lowerable baggage bin, for example an overhead baggage compartment in an aircraft passenger cabin. The baggage bin is lowerable from an upper closed position into a lower open loading position, via a support and guide system arranged on each side of the bin, between side walls of the bin and a supporting structure.

DISCUSSION OF THE RELATED ART

Baggage compartments in aircraft passenger cabins are typically arranged overhead, i.e. above the heads of the seated passengers.

In order to achieve an optimal headroom for the passengers below the baggage compartments on the one hand, and to achieve a convenient accessibility for loading and unloading the baggage compartments on the other hand, such a baggage compartment typically includes a baggage bin that is lowerable out of a housing. Upon lowering the baggage bin from the housing, the open front side of the bin is uncovered or exposed to allow baggage to be loaded into or unloaded from the bin. In order to achieve the best possible access to the baggage bin for loading and unloading, preferably the baggage bin carries out a tilting or pivoting motion in connection with the raising or lowering motion. In this context, the baggage bin will be tilted slightly forward and downward in the access direction when it is in the lower loading position, whereby the front loading edge is somewhat lower than the rear edge of the baggage bin. A support and guide system carries the baggage bin relative to the housing and guides the lowering and raising of the bin.

Such baggage compartments are conventionally known with a wide range of different embodiments of the support and guide systems for lowering and raising the baggage bin. For example, four link support systems are known for supporting and guiding the motion of the baggage bin, from European Patent 0,049,716, or German Patent Laying-Open Publication 195 46 302. German Patent Laying-Open Publication 198 00 588 discloses a lever system including a respective lever arranged at each side of the baggage bin shell, whereby each one of these levers is connected with the respective other lever via a torsion shaft, and a linear guide for guiding the lowering motion for lowering the baggage bin shell out of the housing of the baggage compartment into a loading position. European Patent 0,594,997 discloses a guide system that is arranged on both sides on the side walls of the baggage bin shell, and which achieves a guidance of the lowering and raising motion of the baggage bin shell by means of gear segments or segmental toothed racks.

In all cases, the known support and guide systems are arranged between the housing of the baggage compartment and the side wall of the baggage bin shell. For this reason, in all of the known solutions, there is a certain minimum lateral space requirement for the support and guide system, which means that the available space for the loading volume of the baggage bin, to receive carry-on baggage or the like, is correspondingly reduced.

BRIEF SUMMARY OF THE INVENTION

In view of the above, it is an object of the invention to provide a baggage compartment including a baggage bin that is lowerable from a housing or other support structure, whereby the space required for the support and guide system for the baggage bin is minimized, so as to provide the maximum possible space for the volume of the baggage bin that can be loaded with carry-on baggage or the like. Moreover, it is an object of the invention to construct the support and guide system with relatively few, simple, economical components, to achieve a simple and economical manufacturing, installation, operation, and maintenance of the baggage compartment. The invention further aims to avoid or overcome the disadvantages of the prior art, and to achieve additional advantages, as apparent from the present specification.

The above objects have been achieved according to the invention in a baggage compartment including a baggage bin that is lowerable from a support structure such as a baggage compartment housing or a structural member of the aircraft. A respective support and guide system is arranged on each side of the baggage bin, namely between the side walls of the baggage bin and the side members or side walls of the support structure such as the housing. The support and guide system supports the baggage bin and guides its lowering and raising motion between an upper closed position and a lower open loading position.

According to the invention, each guide system includes front and rear arcuate guide arrangements, such as a front arcuate groove and a rear arcuate groove that are formed in the side wall of the bin or the side wall of the housing or the like, and that each follow a circular arc about a common arc center point. The arcuate guide arrangements further include a guide pin, bolt, stud or the like (generally called guide bolt herein), which is arranged on the respective other side wall of the housing or the bin and which reaches into the respective associated arcuate groove. The support and guide system further includes a linear guide arrangement including a linear guide such as a guide rail, guide track, guide groove or guide slot, and a runner such as a guide roller or a slide block that is engaged with the linear guide to roll or slide linearly therealong.

It is especially advantageous in the invention, that the required interspace between the respective side wall of the housing and the respective adjacent side wall of the baggage bin, for receiving the support and guide system therein, can be minimized, so that the loading volume for the carry-on baggage and the like can be enlarged. The inventive support and guide system for the lowering of the baggage bin is characterized by a very simple construction, which makes it possible to achieve economic advantages not only in the original manufacturing and installation, but also in the ongoing maintenance and service of the inventive baggage compartments. The inventive arrangement further achieves a smooth motion of the baggage bin, without the risk of tilting or jamming of the bin or the support and guide system while opening or closing the baggage compartment. The baggage bin carries out the lowering and raising motion on a simple motion curve.

Further details are the subject matter of particular embodiments of the invention. For example, the front groove may extend over a larger angle of arc than the rear groove, especially at the upper end of the front groove. Thereby, while lowering the baggage bin, the rear guide bolts first reach the top ends of the rear guide grooves and stop the further downward travel of the rear edge of the baggage bin. Then, the front edge of the baggage bin can continue to tilt farther downward until the front guide bolts reach the top ends of the longer front grooves. In this manner, in addition to the linear downward motion, a tilting motion of the baggage bin is also achieved, in order to provide an improved accessibility by lowering the front loading edge of the baggage bin to a position lower than the rear edge of the baggage bin. The above references to the guide bolts reaching the top ends of the arcuate grooves assumes, as an example, that the grooves are provided in the side walls of the bin while the guide bolts are secured to the side members of the housing or the like. This arrangement could alternatively be reversed.

By providing a linear guide groove or channel rather than a linear guide track or rail, and a simple slide block rather than a guide roller, the lateral space requirement for the support and guide system between the opposing side walls of the housing and the baggage bin is further reduced.

In one embodiment, the front groove and the rear groove are each respectively an open groove or slot penetrating entirely through the thickness of the side wall in which they are arranged. In such an embodiment, the guide bolts running along in these open grooves are provided with securing means, such as a bolt head, a nut, a cap, a cotter pin or clevis pin, or the like, to secure the support and guide arrangement against lateral shifting. In another embodiment, the front groove and the rear groove are each merely shallow channels, i.e. closed or blind grooves that do not penetrate entirely through the thickness of the respective side wall in which they are provided. In this embodiment, the guide bolts running along these grooves simply reach into and engage in these grooves. With these simple measures, it is ensured that a lateral shifting or sliding displacement of the baggage bin within the baggage compartment housing is effectively prevented.

According to another optional detail of the invention, stop members may be installed in the grooves and/or on the guide rails or guide slots. By providing such a stop member at a variable adjustable location, this allows the maximum opening range of the baggage bin to be variably adjusted, whereby a high degree of flexibility and a simple adaptability of the baggage compartment to specific requirements of a particular customer are possible.

The inventive arrangement preferably further includes a spring and/or damper arrangement, for supporting and damping the raising and lowering motion of the baggage bin. Such a spring and/or damping arrangement may, for example, include a gas pressure spring. Such an arrangement facilitates the opening and closing of the baggage bin in that the gravity-assisted lowering motion of the baggage bin is countered by a damping element, and the raising motion is reinforced or supported by an assisting force exerted by a spring element. These measures provide a great improvement in passenger convenience, comfort, and safety, for raising and lowering the baggage bin, which may be quite heavy in a fully loaded condition. The baggage compartment may further include any conventionally known latching mechanism to latch the baggage bin in the raised, closed position.

BRIEF DESCRIPTION OF THE DRAWINGS

In order that the invention may be clearly understood, it will now be described in connection with an example embodiment, with reference to the accompanying drawings, wherein:

FIG. 2 is a perspective view of the baggage bin by itself;

FIG. 3 is a perspective view of the housing by itself;

FIG. 4 is a schematic side view of the inventive baggage compartment with a lowerable baggage bin in the upper closed position, with ghost lines showing the hidden components of the inventive support and guide system.

DETAILED DESCRIPTION OF PREFERRED EMBODIMENTS OF THE INVENTION

Figure 1:
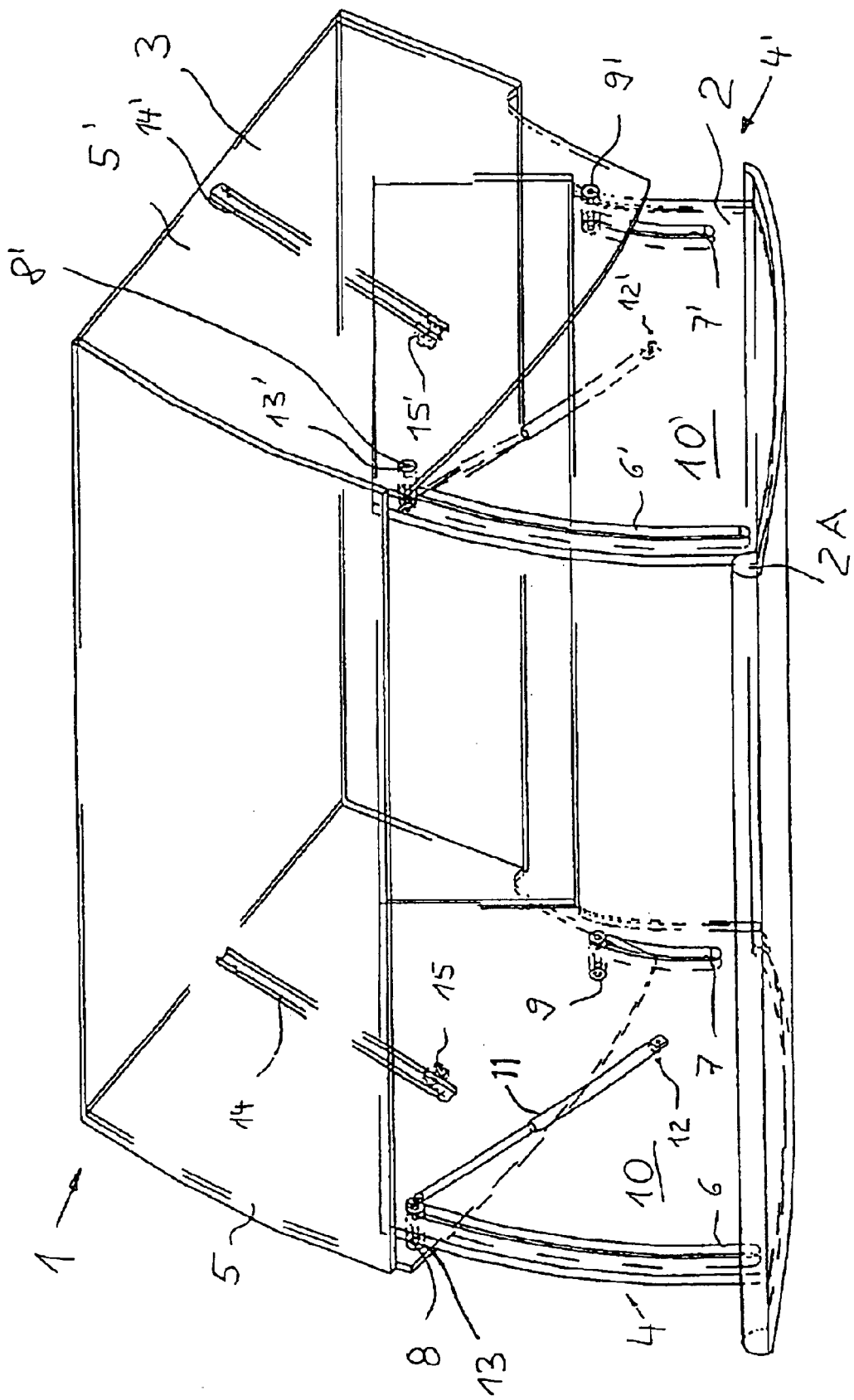
FIG. 1 is a schematic perspective view with ghost lines showing a baggage compartment with a housing and a lowerable baggage bin according to the invention.

FIGS. 1 to 3 show a perspective view of a baggage compartment 1 according to the invention, including a baggage bin 2 that is movably supported by support and guide systems 4, 4' relative to a support structure such as a housing 3 or other aircraft structural component rigidly secured to the airframe. Thereby, the baggage bin 2 is raisable into an upper closed stowed position within the housing 3, and selectively lowerable into a lower open loading position in which the bin 2 hangs down from the housing 3 so as to expose and allow access to the front loading opening of the baggage bin 2, as shown in FIG. 1.

FIG. 2 shows the baggage bin 2 as a separate detail, whereby it can be seen that the baggage bin 2 comprises a bin floor and walls including side walls 10 and 10' that extend up from the floor and bound the internal space of the bin 2, and that also laterally bound the open loading opening on the front side of the bin 2. In each of the side walls 10 and 10', there are arranged a front groove 6 or 6' and a rear groove 7 or 7', whereby these grooves extend generally in an upward and downward direction, the front grooves 6 and 6' extend relatively closely along the front edge of the side walls 10 and 10', and the rear grooves 7 and 7' extend relatively closely along the rear edge of the side walls 10 and 10'. As will be described in greater detail below in connection with FIG. 4, each of the grooves 6, 6', 7, 7' extends along a circular arc about a common arc center point M.

FIG. 3 shows the housing 3 of the baggage compartment as a separate detail, whereby this housing encloses the top and sides of the baggage bin 2 in its upper closed position. The curved bottom floor shell of the baggage bin 2 forms the exposed bottom surface of the overall baggage compartment. The housing 3 includes side walls 5 and 5', between which the side walls 10 and 10' of the baggage bin 2 are received. All of the side walls are parallel to each other, and there are small lateral spaces between the side walls 10, 10' of the baggage bin 2 and the side walls 5, 5' of the housing 3. Connection points such as mounting holes 8A, 9A or 8A' and 9A' are provided in the side walls 5 and 5', and receive respective guide bolts 8 and 9 or 8' and 9' therein. The side walls 5, 5' are an example of generalized side members of the support structure, which do not have to be solid side wall members, but instead could be girders or truss members or the like with open spaces therebetween or therethrough.

The respective support and guide systems 4 and 4' are arranged between and/or integrated in the side walls 5 and 5' of the housing 3 and the side walls 10 and 10' of the baggage bin 2. The housing 3 is fixed rigidly to an aircraft airframe structure, and the support and guide systems 4 and 4' support and movably connect the lowerable baggage bin 2 with respect to the fixed housing 3. Alternatively, the baggage bin 2 may be movably supported and connected to any other fixed rigid part of the aircraft structure, i.e. without a housing 3 per se. The two support and guide systems 4 and 4' respectively have the identical construction, in a mirror-symmetrical arrangement on the two sides of the baggage bin. Therefore, the details of the construction of the support and guide system described below apply equally to both support and guide systems 4 and 4' on opposite sides of the baggage bin 2. As mentioned above, guide bolts 8 and 9 or 8' and 9' are provided in the side walls 5 or 5' of the housing 3. Particularly, the guide bolts 8 and 9 are rigidly fixed in the connection points or holes 8A and 9A in the side wall 5, while the guide bolts 8' 5 and 9' are rigidly fixed in the connection points or holes 8A' and 9A' in the side wall 5'. The guide bolts 8 and 9, as well as 8' and 9', are movably engaged in the front and rear grooves 6 and 7, as well as 6' and 7', in the side walls 10, 10' of the baggage bin 2. In this context, the guide bolts may each be a simple slidable pin or may include a central axle with a guide roller thereon, or a slide block, or the like. In any event, the guide bolts are embodied to slide, glide or roll smoothly along the front and rear grooves 6, 7, 6', 7'.

Preferably, the groove depth of the front and rear grooves 6 and 7 as well as 6' and 7' corresponds to the wall thickness of the side walls 10 and 10' of the baggage bin 2. Thereby, the grooves 6, 7, 6', 7' are through-going open grooves or slots that penetrate entirely through the side walls 10 and 10'. The guide bolts 8 and 9, as well as 8' and 9' can extend entirely through the thickness of the side walls 10 and 10' respectively, in the respective grooves 6, 7 and 6', 7', and protrude into the internal space or volume of the baggage bin 2. In order to secure the baggage bin 2 against a lateral shifting or sliding, and to secure the guide bolts 8, 9, 8', 9' within the corresponding groove 6, 7, 6', 7', the protruding ends of the guide bolts 8, 9, 8', 9' in the interior of the baggage bin 2 are secured with a counternut or cap or the like.

The grooves 6 and 7, as well as 6' and 7', respectively run along circular arc segments that arc about a common arc centerpoint M as shown in FIG. 4. In comparison to the rear groove 7 or 7', the front groove 6 or 6' is characterized by a larger radius as well as a larger arc angle, namely α2>α1, especially due to a longer arcing extension of the upper portion of the groove 6 or 6'. This achieves an improved accessibility to the baggage bin 2 in the lowered open position as follows. When lowering the baggage bin 2, first a linear downward motion of the bin 2 is carried out, and then a pivoting or tilting motion along an arc is carried out to further lower the front loading edge 2A of the baggage bin 2. In the final open position, then, the front loading edge 2A is somewhat lower than the rear edge 2B of the baggage bin 2, which simplifies the access to the open front of the baggage bin 2.

This motion is achieved as follows. First, the bin 2 moves downwardly with the front guide bolts 8 and 8' and the rear guide bolts 9 and 9' moving uniformly relatively along the front grooves 6 and 6' and the rear grooves 7 and 7', until the rear guide bolts 9 and 9' reach the top ends of the rear grooves 7 and 7' and therefore stop. Note that this motion in actuality involves the grooves moving along the stationary guide bolts, but the motion can be described alternatively as above with reference to the relative motion. In any event, at this point, the front guide bolts 8 and 8' may continue to move further upwardly along the greater arcuate extension of the front grooves 6 and 6' (i.e. the grooves move further downwardly along the bolts). This allows the further tilting motion of the bin 2 about the rear guide bolts 9, 9', which causes the front loading edge 2A to pivot to a position lower than the rear edge 2B.

The above two-part motion can be further supported by a linear guide arrangement as follows. Namely, the support and guide system 4 may further include a linear guide track or rail 14, 14' in which a guide roller 15, 15' is movably engaged. The guide track 14, 14' is arranged on the inner side of the side wall 5, 5' of the housing 3, while the guide roller 15, 15' is rotatably secured on the laterally outer surface of the side wall 10 or 10' and engages with the guide track 14, 14'. While carrying out the lowering motion of the bin 2, the guide roller 15, 15' moves linearly along the guide track 14, 14' in a downward direction, whereby the baggage bin 2 is moved linearly downwardly out of the housing 3. Note that the motion may be somewhat forwardly and downwardly, with the guide track being non-vertically tilted as shown. When the guide roller 15, 15' has reached the bottom end point of the guide track 14, 14', the above mentioned tilting motion is carried out for reaching the final lowered and tilted open position with a better accessibility. This is achieved because the front groove 6, 6' extends over a larger arc angle in the upward direction than the rear groove 7, 7' as described above.

In the closed upper position of the baggage bin 2 within the housing 3, the guide bolts 8 and 9 or 8' and 9' are located at the bottom end areas of the grooves 6 and 7 or 6' and 7'. On the other hand, in the lowered, but not yet tipped position of the baggage compartment 2, the rear guide bolt 9, 9' has reached the upper end of the rear groove 7, 7', while the front guide bolt 8, 8' has not yet reached the upper end of the front groove 6, 6'. Thus, at this stage, the baggage bin 2 will tilt forward and downward about the pivot point defined by the rear guide bolts 9, 9' at the upper ends of the rear grooves 7, 7', while the front guide bolts 8, 8' continue to move along the upper arcuate extension of the front grooves 6, 6'. This range of pivoting motion is defined by the difference between the arc angles α2 and α1 of the respective front grooves 6, 6' and rear grooves 7, 7'.

According to a further optional but advantageous embodiment of the invention, stop members 20 may be adjustably secured in the grooves 6, 6', 7, 7' and/or on the guide track 14, 14'. By adjusting the position of these stop members 20, it is possible to variably adjust and limit the range of the lowering motion and/or the tilting motion, and therewith the opening range, of the baggage bin 2.

Figure 5:
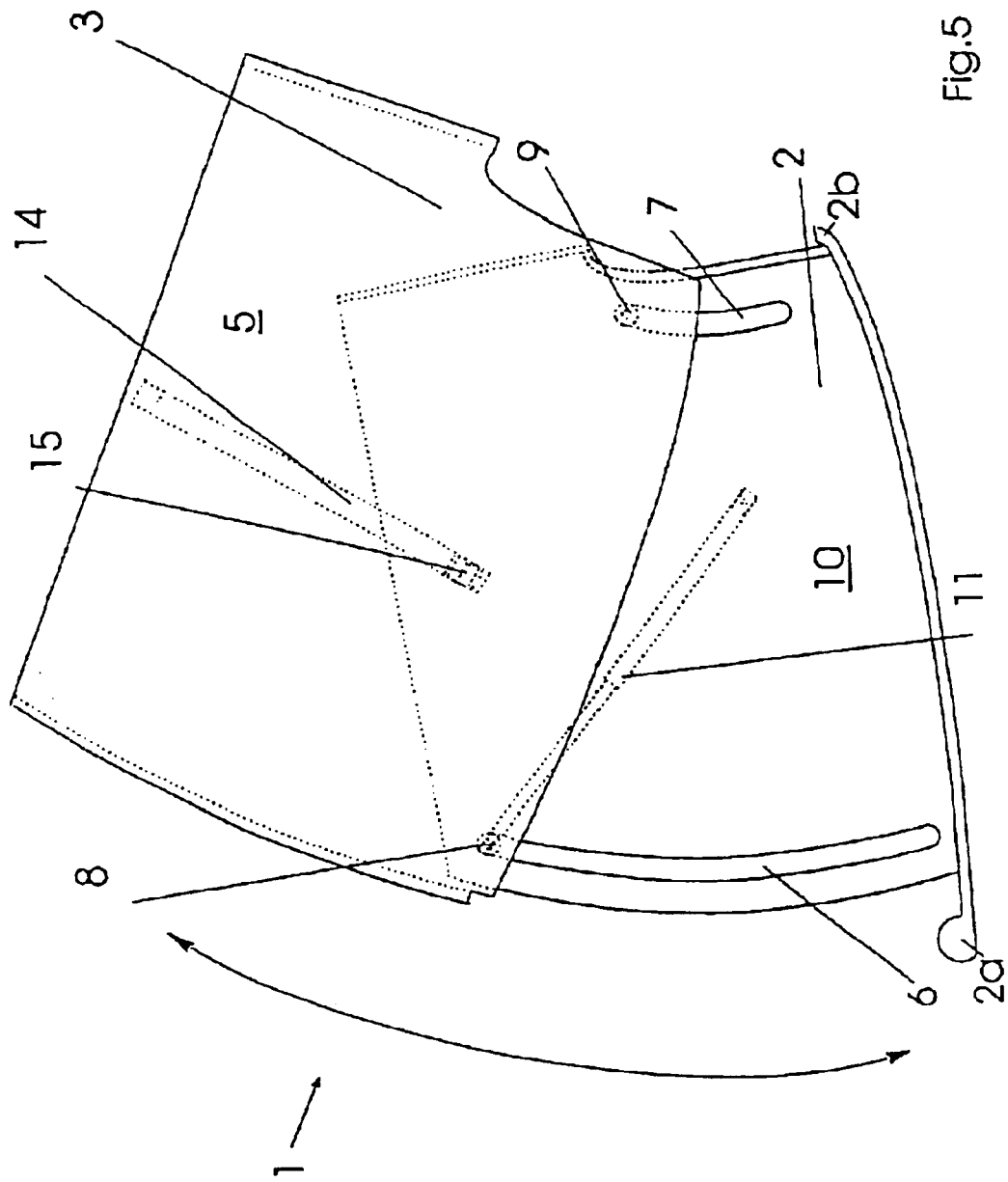
FIG. 5 is a view similar to that of FIG. 4, but showing the baggage bin in the lower open loading position.

The inventive arrangement preferably further includes a spring arrangement, such as preferably a gas pressure spring 11, to provide a lift support force which facilitates the opening and closing of the baggage bin 2, especially when it is loaded with baggage. The gas pressure spring 11 may, for example, be arranged as shown in FIGS. 1, 4 and 5, with a first pivotable connection point 12 at one end of the gas pressure spring 11 connected to the side wall 10 of the baggage bin 2, and a second pivotable connection point 13 at the opposite end of the gas pressure spring 11 connected to a rigid structure, such as on the housing 3, preferably on the front guide bolt 8. With such an arrangement, the gas pressure spring 11 exerts a damping effect on the downward motion while the baggage bin 2 is being opened, and exerts an auxiliary lift force to support the upward lifting motion of the baggage bin 2 while it is being closed. This is especially helpful for opening and closing the bin in a fully loaded and thus heavy condition.

FIGS. 4 and 5 show respective side views of the baggage compartment 1 according to the invention. The kinematic relationships and motions of the components of the support and guide system 4 are shown in the closed position of the baggage bin 2 within the housing 3 in FIG. 4, and in the open position of the baggage bin 2 in FIG. 5. These Figures especially clearly show the groove or slot guidance of the guide bolts 8 and 9 in the grooves 6 and 7, as well as the position and arrangement of the linear guide rail or track 14, which is arranged on the side wall 5 of the housing 3 in order to ensure a linear downward motion of the baggage bin 2 without a tilting or jamming thereof.

The illustrated embodiment is simply one example of a range of different variants or embodiments according to the principle of the invention, which could alternatively be realized in various different forms or arrangements. For example, the guide roller 15 that is movably arranged and engaged in the guide track or rail 14 could alternatively be a simple slide block or glide block, for example of a polymer with low sliding friction (e.g. polytetrafluoroethylene). Instead of the guide rail or track 14, a simple groove, channel, or slot can be let into the side wall 5 of the housing 3 to receive the slide block slidably therein to achieve the required guidance function. Such a construction further reduces the amount of lateral space required between the side walls 5 and 10, because the components are let into at least one of the side walls to the extent possible. In a further variant, the grooves 6 and 7 are provided in the side walls 5 rather than the side walls 10, while the guide bolts 8 and 9 are arranged in the movable baggage bin 2, or particularly in the side walls 10 thereof. Moreover, the arrangement of the guide rail or track 14, or the simple guide channel described above, and the guide roller 15 or the replacement slide block, could be reversed. In other words, the guide track could be provided on the side wall 10 of the baggage bin 2, while the guide roller 15 is provided on the side wall 5 of the housing 3.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A baggage compartment, comprising:
    a support structure;
    a bin defining an at least partially closed volume configured to store baggage; and
    a guide connecting the support structure and the bin, the guide configured to move the bin along a first portion of a path linearly and a second portion of the path rotationally,
    wherein the guide comprises a first and a second pairs of grooves disposed on one of said bin and support structure, and said guide further comprises protrusions disposed on the other of said bin and support structure, each of said protrusions being movably engaged in one of said grooves.

2. The baggage compartment according to claim 1, wherein the support structure comprises a housing.

3. The baggage compartment according to claim 1, wherein the support structure comprises a frame of an aircraft.

4. The baggage compartment according to claim 1, wherein the first and second pairs of grooves are disposed on the bin.

5. The baggage compartment according to claim 4, wherein the first pair of grooves is disposed adjacent a front open portion of the bin and the second pair of grooves is disposed adjacent a back portion of the bin opposite to the front open portion, the first and second pairs of grooves having an arcuate shape.

6. The baggage compartment according to claim 5, wherein the first pair of grooves has a greater radius of curvature and encompasses a greater angular range than the second pair of grooves.

7. The baggage compartment according to claim 1, wherein the protrusions are fasteners.

8. The baggage compartment according to claim 7, wherein the fasteners are bolts.

9. A baggage compartment, comprising:
    a support structure;
    a bin defining an at least partially closed volume configured to store baggage; and
    a means for connecting the support structure and the bin, the means configured to move the bin along a first portion of a path linearly and a second portion of the path rotationally,
    wherein the means for connecting comprises a first and a second pairs of grooves disposed on one of said bin and support structure, and said means for connecting further comprises protrusions disposed on the other of said bin and support structure, each of said protrusions being movably engaged in one of said grooves.

10. The baggage compartment according to claim 9, wherein the support structure comprises a housing.

11. The baggage compartment according to claim 9, wherein the support structure comprises a frame of an aircraft.

12. The baggage compartment according to claim 9, wherein the first and second pairs of grooves are disposed on the bin.

13. The baggage compartment according to claim 12, wherein the first pair of grooves is disposed adjacent a front open portion of the bin and the second pair of grooves is disposed adjacent a back portion of the bin opposite to the front open portion, the first and second pairs of grooves have an arcuate shape, and the first pair of grooves has a greater radius of curvature and encompasses a greater angular range than the second pair of grooves.

14. The baggage compartment according to claim 1, wherein the first pair of grooves is disposed adjacent a front portion of the bin.

15. The baggage compartment according to claim 1, wherein the second pair of grooves is disposed adjacent a back portion of the bin.

16. The baggage compartment according to claim 15, wherein the first pair of grooves is disposed adjacent a front portion of the bin opposite to the back portion.

17. The baggage compartment according to claim 1, wherein said guide further comprises a stop member at an adjustable location, said stop member being configured to limit an opening range of said bin.

18. The baggage compartment according to claim 1, wherein said guide further comprises a linear guide track and a guide roller movably engaged in said linear guide track.

19. The baggage compartment according to claim 18, wherein said linear guide track is disposed on an inner wall of said support structure and said guide roller is disposed on an inner wall of said bin.

20. The baggage compartment according to claim 1, wherein said guide further comprises a linear guide groove and a slide block movably engaged in said linear guide groove.

21. The baggage compartment according to claim 1, wherein said grooves are arcuate in shape.

22. The baggage compartment according to claim 21, wherein the first pair of grooves has a greater radius of curvature than the second pair of grooves.

23. The baggage compartment according to claim 21, wherein said grooves have concave sides facing a back portion of said bin.

* * * * *